United States Patent [19]
Yano

[11] Patent Number: 4,895,507
[45] Date of Patent: Jan. 23, 1990

[54] DIE ASSEMBLY EXCHANGING APPARATUS FOR EXTRUDER

[75] Inventor: Eiji Yano, Kodaira, Japan

[73] Assignee: Bridgestone Corporation, Tokyo, Japan

[21] Appl. No.: 261,216

[22] Filed: Oct. 24, 1988

[30] Foreign Application Priority Data

Nov. 12, 1987 [JP] Japan .................................. 62-285967

[51] Int. Cl.⁴ ............................................. B29C 47/12
[52] U.S. Cl. .................................. 425/192 R; 264/39; 425/461
[58] Field of Search ................ 425/190, 192 S, 192 R, 425/191, 131.1, 378.1, 461; 264/39, 169, 177.1

[56] References Cited

U.S. PATENT DOCUMENTS 4,652,410 3/1987 Inoue et al. ............................ 264/39

FOREIGN PATENT DOCUMENTS

55-99827 7/1980 Japan .
56-139527 10/1981 Japan .
61-44618 3/1986 Japan .
61-44619 3/1986 Japan .

Primary Examiner—Jay H. Woo
Assistant Examiner—Timothy W. Heitbrink
Attorney, Agent, or Firm—Sughrue, Mion, Zinn, Macpeak & Seas

[57] ABSTRACT

An apparatus for exchanging die assemblies for extruding a material from an extruder. The apparatus employs a carriage on an extruding side of the extruder, carriage moving device for moving the carriage along a longitudinal axis along rails perpendicular to an extruding direction of the material, two grasping units supported on the carriage on the right and left sides, grasping unit moving devices for moving the grasping units along a traverse axis in parallel with the extruding direction, respectively, grasping unit vertical moving devices for moving the grasping units along a vertical axis perpendicular to the longitudinal and traverse directions, respectively, and a plurality of storng stands spaced apart from each other in the longitudinal directions for storing various kinds of die assemblies. Each of the grasping units extending in the vertical axis and having a pair of arms provided with grasping devices for grasping one of the die assemblies.

9 Claims, 7 Drawing Sheets

FIG_4

FIG_5

FIG_9

DIE ASSEMBLY EXCHANGING APPARATUS FOR EXTRUDER

BACKGROUND OF THE INVENTION

This invention relates to an apparatus for exchanging die assemblies of a plurality of kinds for an extruder for a short period of time.

Apparatus for exchanging dies assemblies for extruders have been known, for example, as disclosed in Japanese Patent Application Laid-open No. 61-44,618. The apparatus disclosed in the Laid-open application comprises a die holder arranged on an extruding side of an extruder and extending in a first direction perpendicular to an extruding direction (vertical direction) and in parallel with a horizontal, a hydraulic cylinder for moving the die holder in the first direction, two die assembly loading units provided on the die holder and spaced apart from each other in the first direction, and a lifting jack for moving the die holder in a second direction in parallel with the extruding direction.

In an exchanging die assembly with such apparatus, the following steps are effected. It is assumed that a die assembly located on the one die assembly loading unit is mounted on a delivery opening of the extruder and a material is being extruded through the die assembly. A die assembly to be next used is loaded on the other die assembly loading unit. When the extruding operation is completed under such a condition, the die assembly is released from the extruder. At the same time, the lifting jack is operated to move the die holder in the second direction away from the extruder. As a result, the used die assembly is arranged on the one die assembly loading unit. As the die holder is pressed to the extruder by the lifting jack during the extrusion of the material, time loss is less and operation efficiency is improved in comparison with a case where the die assembly is retracted from the extruding position after the die holder is separated from the die assembly.

Thereafter, the die holder is moved in the first direction by means of the hydraulic cylinder so that the die assembly on the one die assembly loading unit is moved to an exchanging position and the die assembly on the other die assembly loading unit is moved to a position in opposition to the delivery opening of the extruder. The lifting jack is then actuated to move the die holder in the second direction to press the die assembly against the extruder, while the die assembly is clamped to the extruder by clamp means. In this case, the used die assembly on the other die assembly loading unit is exchanged with a die assembly to be next used by an operator or die assembly storing and supplying means.

With the die assembly exchanging apparatus for the extruder above described, however, the die older cuts the extruded material on the way of the operation, if the die holder is moved in the first direction during operation. It is, therefore, required to fix the die holder at a predetermined position, so that positions where the die assemblies are exchanged are limited to one or two. As a result, in the event that die assemblies of three or more kinds are exchanged, a die assembly storing and supplying apparatus such as a rotary index or the like is needed. Therefore, the apparatus becomes bulky and expensive as a whole. It may be possible to exchange the die assemblies by an operator using a crane or the like without using the die assembly storing and supplying apparatus. However, such an operation with the crane is dangerous and hard labor.

SUMMARY OF THE INVENTION

It is a primary object of the invention to provide an improved apparatus for exchanging die assemblies for an extruder, which eliminates all the disadvantages of the prior art and is capable of providing a number of storing stands for die assemblies of various kinds and able to exchange die assemblies during extruding operation for a very short period of time and which is simple in construction and inexpensive to manufacture.

In order to achieve this object, the apparatus for exchanging die assemblies for an extruder according to the invention comprises a carriage arranged on an extruding side of the extruder, first moving means for moving said carriage along a first axis perpendicular to an extruding direction of the extruder and in parallel with the horizontal, two grasping units supported by said carriage and spaced from each other along the first axis, second moving means for moving said grasping units along a second axis in parallel with said extruding direction, respectively, third moving means for moving said grasping units along a third axis perpendicular to said first and second axes, respectively, and a plurality of storing stands arranged spaced apart from each other in the first directions beside a moving passage of said carriage for storing various kinds of die assemblies, respectively, and each of said grasping units extending along the said third axis and having a pair of arms provided with grasping means for grasping the die assembly.

It is assumed that the extruder is operated and the material is being extruded from a die assembly mounted on the extruder. At this time, the grasping unit on one side grasps a die assembly mounted on the extruder, while the grasping unit on the other side grasps a used die assembly. After the grasping of the die assembly by the grasping unit on one side has been released, the second and third moving means are actuated to move the grasping unit on one side to a position where the grasping unit does not interfere with the extruded material and equipment about it. Each of the grasping units have a pair of arms extending in the third direction and is moved in the third direction by the third moving means so that the grasping unit on one side can perform the movement without cutting the extruded material on the way of the operation.

The first moving means is then actuated to move the carriage in the first direction until the grasping unit on the other side is moved to the position where it is in opposition to the empty storing stand. The used die assembly is transferred into the empty storing stand. The carriage is then moved again in the first direction to move the grasping unit on one side to a position where it is in opposition to a die assembly to be next used stored in any storing stand. The die assembly to be next used is then grasped by the grasping means of the grasping unit on one side to receive the die assembly from the storing stand.

The carriage is then moved again in the first direction until the grasping unit on the other side arrives at a position where it is in opposition to the extruder. The second and third moving means are then actuated to move the grasping means of the grasping unit on the other side to a position where it grasps the die assembly on the extruder. In this case, the grasping unit on the other side does not cut the extruded material in the same manner as in the above case. The die assembly is then grasped by the grasping unit. The exchanging of the die assembly is effected during the extrusion of the material, while the carriage and the grasping unit are moved away from the extruder. Therefore, it is possible to provide a number of exchanging positions of the die assemblies. Such exchanging positions or storing stands are simple in construction because the grasping units go to the positions for receiving the die assemblies. Accordingly, the apparatus becomes simple in construction and inexpensive as a whole.

When the extruding operation is completed, the grasping unit on the other side receives the used die assembly from the extruder. The grasping unit and the die assembly are moved in the second and third directions away from the extruder. Thereafter, the carriage is moved in the first direction to move the grasping unit on one side grasping the die assembly to be next used to the position where it is in opposition to the extruder. The die assembly to be next used is fed from the grasping unit on one side to the extruder and is mounted on the extruder. The extruding operation is then again started.

When the extrusion of the material is completed, the die assembly on the extruder is grasped by either of the grasping units in this manner. Accordingly, there is not time loss in exchanging the die assemblies and the working efficiency is improved, in comparison with the case that grasping units await at positions remote from the extruder. Moreover, only the grasping units of slight weight are moved in the second direction without moving the carriage of heavy weight in the second direction. Therefore, the energy efficiency in operating of the apparatus is improved.

The invention will be more fully understood by referring to the following detailed specification and claims taken in connection with the appended drawings.

DETAILED DESCRIPTION OF PREFERRED EMBODIMENTS

Figure 1:
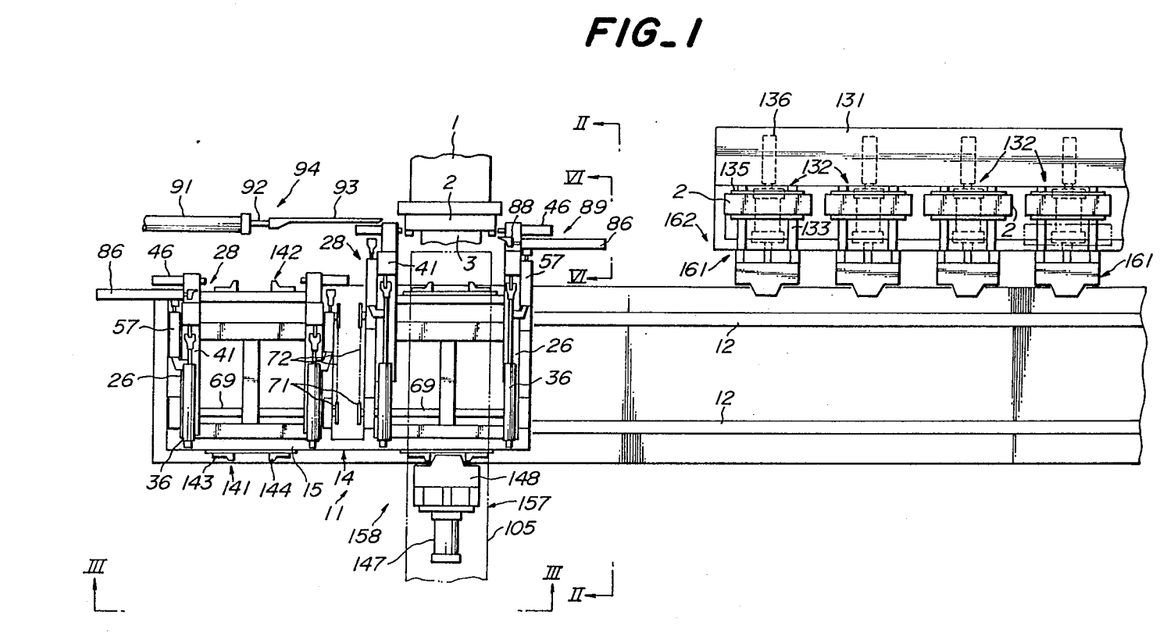
FIG. 1 is a plane view illustrating one embodiment of the present invention.
Figure 2:
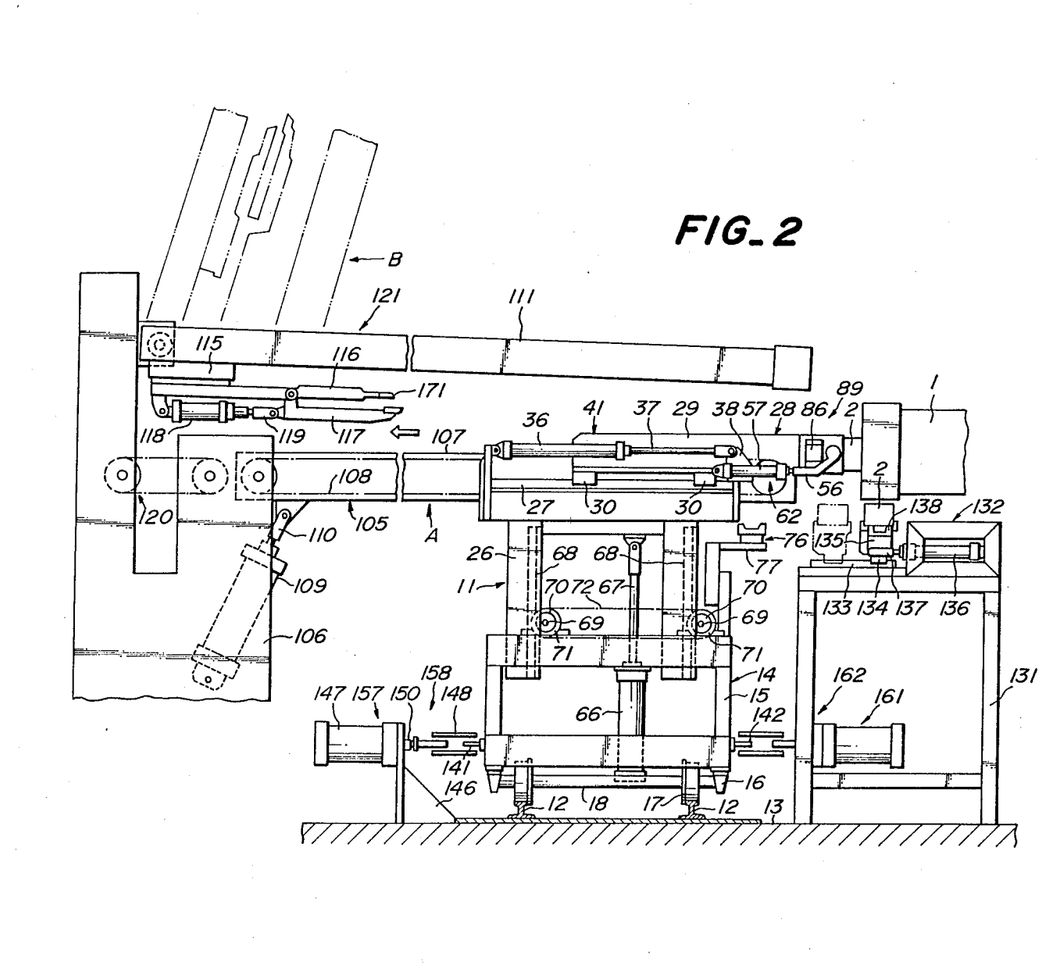
FIG. 2 is a sectional view taken along the line II—II in FIG. 1.
Figure 3:
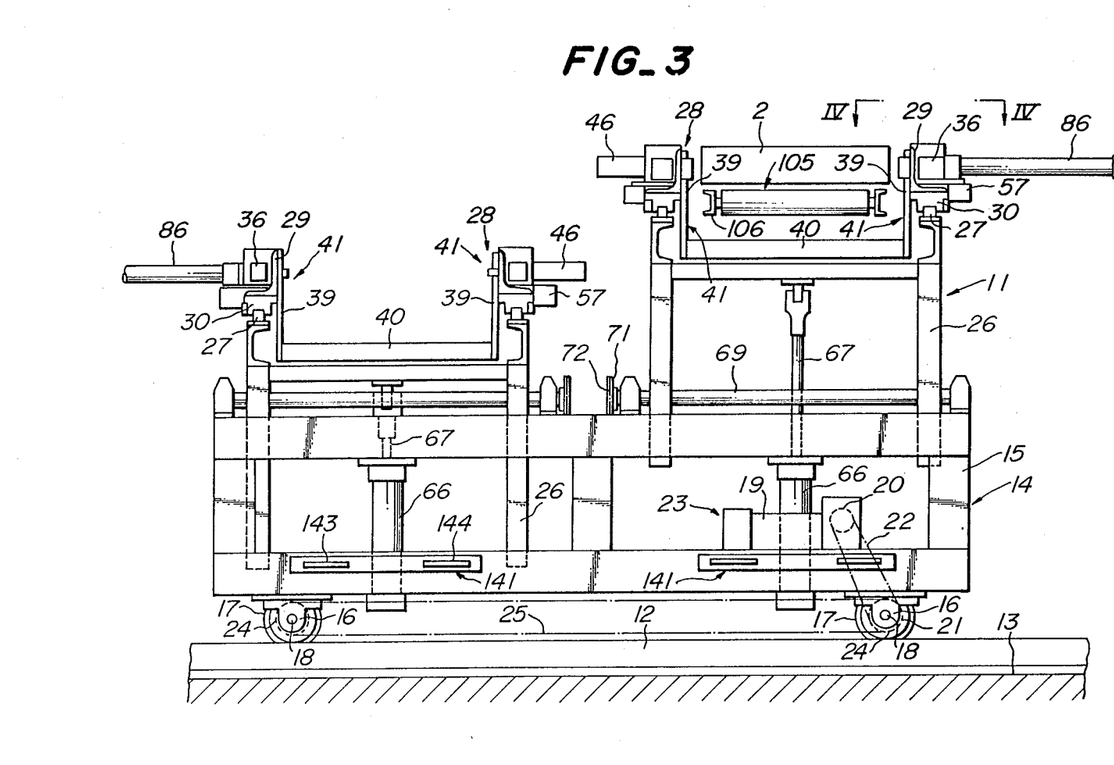
FIG. 3 is a partial front elevation viewed in directions shown by arrows III in FIG. 1.

Referring to FIGS. 1, 2 and 3, reference numeral 1 illustrates an extruder having a front end to which is held and fixed a die assembly comprising a preforming die, dies, a die holder and the like by a clamp mechanism (not shown). The extruder 1 serves to squeeze rubber so as to extrude it through the die assembly 2, thereby continuously forming extruded materials 3 having a constant section, for example, tread rubbers.

A die assembly exchanging apparatus 11 is arranged on an extruding side of the extruder 1 for exchanging the die assemblies 2. A pair of rails 12 are arranged on a floor 13, which extend in a first direction perpendicular to the extruding direction and in parallel with the horizontal. The first direction in this embodiment is the direction from left to right or vice versa viewed in FIG. 1. On the rails is supported a carriage 14 having a box-shaped frame 15. Onto a underside of the frame 15 are mounted two pairs of bearings 16 for rotatably supporting axles 18 to which are fixed wheels 17 rotatingly contacting the rails 12. Onto the frame 15 is mounted a motor 19 having a brake. A chain 22 extends about a sprocket 20 fixed to an output shaft of the motor 19 and a sprocket 20 fixed to the axle 18. Chains 25 extend about sprockets 24 fixed to the axles 18 so that the two pairs of the wheels 17 are connected to be braked and started in synchronism with each other, thereby preventing any slip of the wheels relative to the rails. When the motor 19 is energized to rotate the wheels 17, the carriage 14 is moved from left to right or vice versa viewed in FIG. 1. The motor 19, the sprockets 20 and 21 and the chain 22 form as a whole first moving means 23 for moving the carriage 14 in the first direction.

The carriage 14 supports two elevator frames spaced from each other in the first direction so as to be moved upward and downward. On an upper surface of each the elevator frame 26 are arranged a pair of slide rails 27 extending in a second direction which is perpendicular to the first direction and in parallel with in the extruding direction. Two grasping units 28 are arranged spaced apart from each other in the first direction above the elevator frames 26, respectively. Each of the grasping units 28 comprises a pair of movable members 29 extending in the second direction and arranged on slide rails 27 through slide blocks 30. The slide blocks 30 are fixed to undersides of the movable members 29 in a manner slidable on the slide rails 27. Two cylinders 36 as second movable means are connected to a front upper end of each of the elevator frames 26 in a manner that a head end of the cylinder 36 is pivotally movable. A distal end of a piston rod 37 of the cylinder 36 is pivotally connected to a bracket 38 fixed to a center of a longitudinal length of the each movable member 29. As a result, when the cylinder 36 is actuated to extend or retract its piston rod 37, the movable member 29 is moved in the second direction which is in parallel with the extending direction.

Moreover, to each of the movable members 29 is connected an upper end of an arm member 39 which is spaced in the first direction from an arm member of the other movable member 29 and extends in third direction which is vertical and perpendicular to both the first and second directions. Lower ends of the arm members 39 are connected by a connecting member 40 extending in the first direction. The movable members 29 and the arm members 39 form a pair of arms 41.

Figure 4:
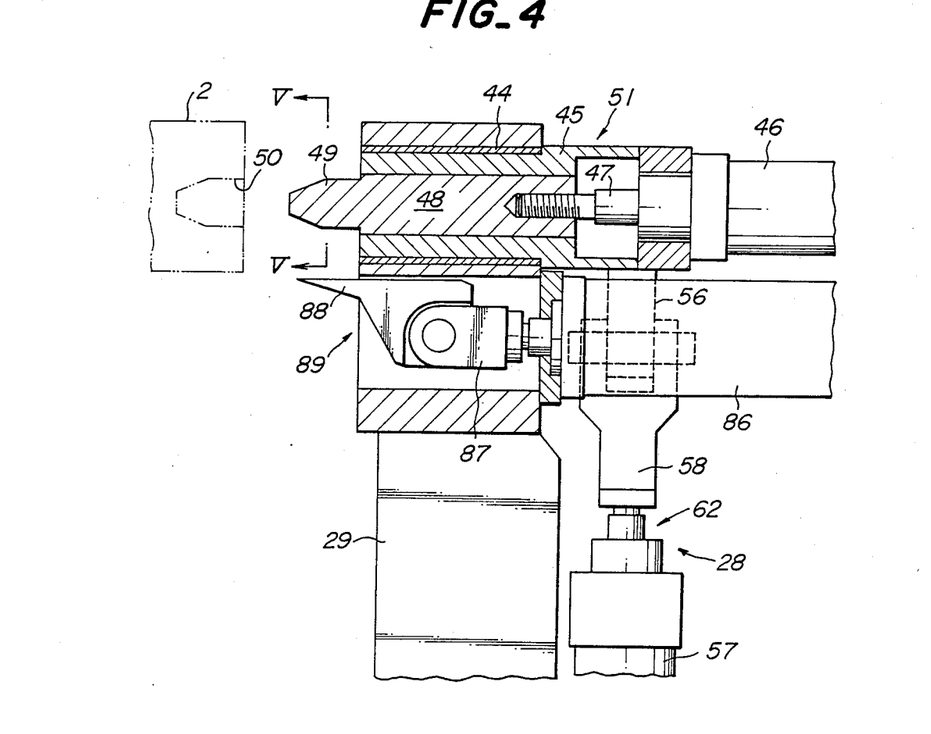
FIG. 4 is a partial sectional view taken along the line IV—IV in FIG. 3.
Figure 5:
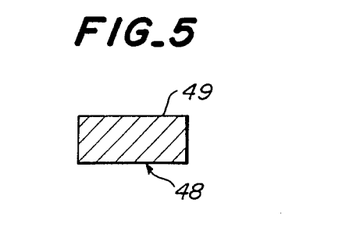
FIG. 5 is a sectional view taken along the line V—V in FIG. 4.
Figure 6:
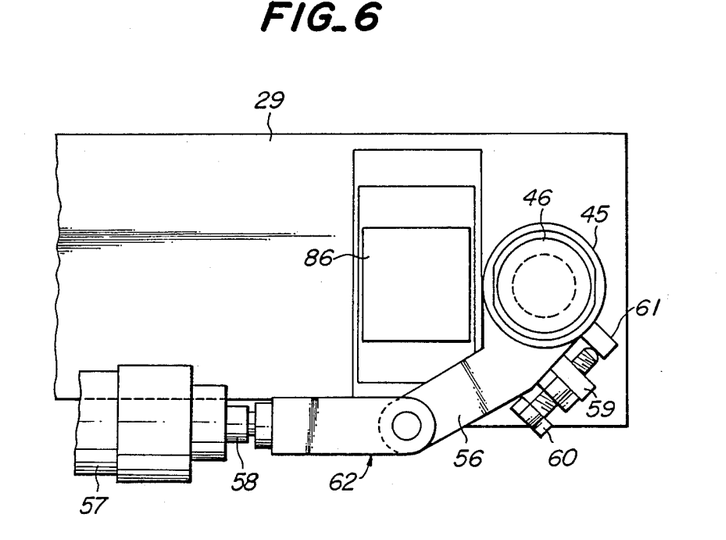
FIG. 6 is a side elevation viewed in directions shown by arrows VI in FIG. 1.

As shown in FIGS. 4 and 6, a rotating sleeve 45 extending in the first direction is rotatably supported by a bearing 44 at the upper end of each of the arms 41, or in more detail at the rear end of the movable member 29. To an outer end of the rotating sleeve 45 is fixed a rod end of a cylinder 46 which is coaxial with the rotating sleeve 45. To an outer end of a piston rod 47 of the cylinder 46 is connected a grasping pin 48 which is inserted in the rotating sleeve and formed with a tapered insert portion 49 having a rectangular cross-section. The die assembly 2 is formed in both side ends with rectangular apertures 50 into which the insert portions 49 are inserted, respectively, when the piston rods 47 of both the cylinders 46 extend toward each other together with the grasping pins 48. By this technique the die assembly 2 is grasped on both sides by the grasping unit 28. The cylinders 46 and the grasping pins 48 form as a whole grasping means 51.

A bottom of a rocking arm 56 is connected to an outer circumference of each of the rotating sleeves 45. A front end of a piston rod 58 of a cylinder 57 is rotatably connected to a front end of each rocking arm 56. A head end of the cylinder 57 is pivotally connected to a center portion of each movable member 29. As a result, when the cylinders 57 are actuated to extend the piston rod 58 to their stroke ends, the cylinders 46, the grasping pins 48 and the die assembly 2 are rotated through 90° in unison in a counterclockwise direction viewed in FIG. 6. As a result, an extruding passage in the die assembly 2 extends in a vertical direction so that operations are easily effected such as cleaning operation for removing rubber remaining in the die assembly 2. A stopper bolt 60 is screwed into a bracket 59 fixed to a rear end of each movable member 29. When the cylinders 57 are actuated to retract their piston rods 58, stopper members 61 fixed to the rotating sleeves 45 abut against the stopper bolts 60 where the stopped insert portions 49 are aligned with the rectangular apertures 50. The cylinders 57, the stopper bolts 60 and the stopper members 61 form rotating means 62 for rotating the die assembly together with the grasping means 51 to improve the ease of work of the die assembly 2.

Referring again to FIGS. 1, 2 and 3, to the frame 15 immediately below each elevator frame 26 is fixed a cylinder 66 as third moving means extending in vertical direction (the third direction). A front end of a piston rod 67 of each cylinder 66 is pivotally connected to the elevator frame 26. As a result, when the respective cylinders 66 are actuated to extend or retract their piston rods 67, the elevator frames 26 and the grasping units 28 are moved in the vertical direction (the third direction). Each elevator frame 26 has a pair of racks 68 fixed thereto extending in the vertical direction. With each rack 68 is engaged a pinion 70 fixed to each of a pair of rotating shafts 69 extending in the first direction. Moreover, a chain 72 extends about sprockets 71 fixed to the respective rotating shafts 69, thereby smoothly effecting vertical movements of the elevator frame 26.

Figure 7:
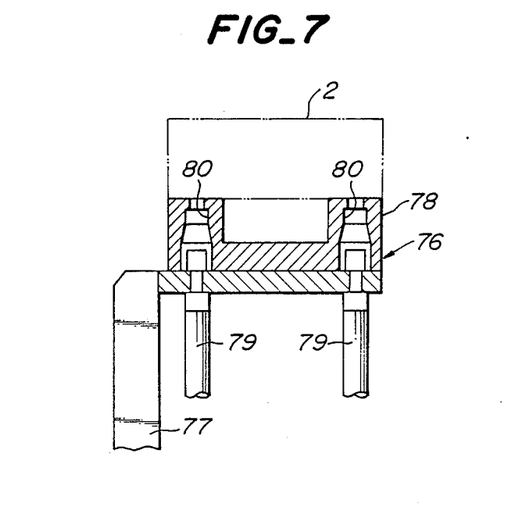
FIG. 7 is a partial sectional front elevation of heating means.

Referring to FIGS. 2 and 7, there are provided at the rear portion of the carriage 14 two heating means 76 which are spaced from each other in the first direction by a distance substantially equal to a distance between the grasping units 28 correspondingly thereto. Each of the heating means 76 comprises a heating block 78 fixed to the frame 15 through an inverted L-shaped bracket 77. Each heating block 78 is formed therein with a plurality of passages 80 for causing to pass hot water, steam and the like supplied through piping 79. Therefore, when the die assembly 2 grasped by the grasping unit 28 is loaded on the heating block 78 as shown in phantom lines in FIG. 7, hot water is supplied through the passages 80 into the die assembly 2, so that the die assembly 2 is always heated. As a result, it is possible to heat the die assembly 2 until the time immediately before loading the die assembly on the extruder 1 so that the time required for the steady condition of the extrusion can be shortened.

Referring to FIGS. 1, 2, 3, 4 and 6, a rod end of a cylinder 86 extending in the first direction is fixed to a rear end of the outer movable member 29 of each elevator frame 26. A cutter 88 is secured to the front end of a piston rod 87 of each cylinder 86. When the cylinders 86 are actuated to extend the piston rods 87, the cutters 88 slidably move in front of the die assembly 2 to cut the extruded material 3 from the die assembly 2 along the width of the material. The cylinders 86 and the cutters 88 form as a whole first cutting means 89 for cutting the extruded material 3 in front of the die assembly 2.

Reference numeral 91 denotes a cylinder which is fixed to a frame (not shown) and extending in the first direction and has a piston rod 92 provided at its end with a cutter 93 fixed thereto. After the die assembly 2 has been removed from the extruder 1, the piston rod 92 is extended from the cylinder 91 so that the cutter 93 slidably moves on the front end of the extruder 1 to cut the rubber flowing from a delivery opening of the extruder 1. The cylinder 91 and the cutter 93 form as a whole second cutting means 94 for cutting at the delivery opening the rubber that has flowed therefrom.

Referring to FIGS. 1, 2, 3 and 8, a belt conveyor 105 as transfer means is provided extending in the second direction in front of the extruder 1. The belt conveyor 105 comprises a rockable frame 107 whose front end is pivotally connected to a frame 106, and a conveyor belt 108 supported by the rockable frame 107 and driven by a driving motor (not shown) in a direction shown by an arrow in FIG. 2. To the frame 106 is connected a head end of a cylinder 109 having a piston rod 110 whose distal end is connected to the rockable frame 107. As a result, when the cylinder 109 is actuated to extend the piston rod 110, the belt conveyor 105 is rocked from a horizontal position A shown in solid lines to a retracted position B shown in phantom lines in FIG. 2. When it assumes the horizontal position A, the rear end of the belt conveyor 105 is positioned between the arms 41 shown in FIG. 3.

Figure 8:
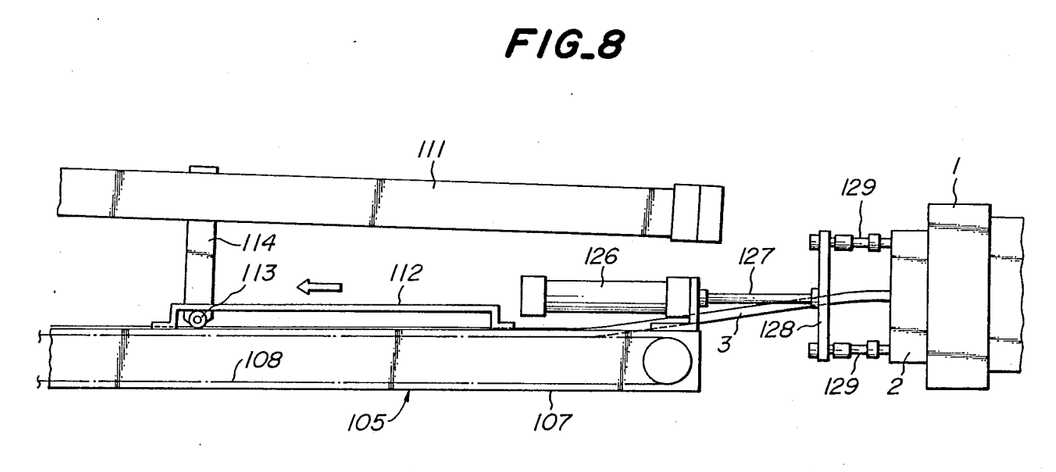
FIG. 8 is a front elevation of the proximity of the belt conveyor.
Figure 9:
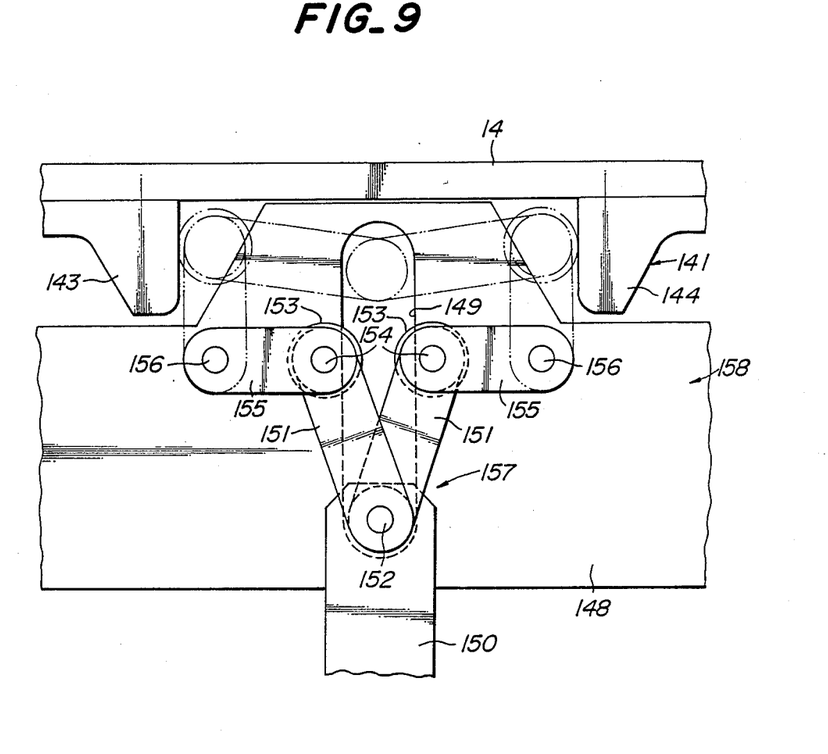
FIG. 9 is a plan view of the first positioning and fixing means.

Above the belt conveyor 105 is provided a rodless cylinder 111 extending in the second direction and having a front end pivotally connected to the frame 106. A cam follower 113 is rollingly interposed between the rockable frame 107 and a guide rail 112 fixed to a mid portion of an upper surface of the rockable frame 107 (FIG. 8). The cam follower 113 is rotatably supported by a lower end of a connecting member 114 fixed to a central portion of the cylinder 111. As a result, when the rockable frame 107 is rocked, the rocking movement of the rockable frame 107 is transferred through the cam follower 113 and the connecting member 114 to the cylinder 111 so that the cylinder 111 is rocked in the same direction in synchronism with the rocking movement of the rockable frame 107. When the rockable frame 107 and the cylinder 111 are rocked, the cam follower 113 is rollingly moved in the second direction between the guide rail 112 and the rockable frame 107.

The cylinder 111 has a slider 115 (FIG. 2) to which is secured a front end of a fixed pawl 116. An L-shaped end of a movable pawl 117 is pivotally connected to a mid portion of the fixed pawl 117. The other end of the movable pawl 117 is positioned immediately below a rear end of the fixed pawl 116. To a front end of the fixed pawl 116 is pivotally connected a head end of a cylinder 118 having a piston rod 119 whose outer end is connected to a curved portion of the movable pawl 117. As a result, when the cylinder 118 is actuated, the fixed and movable pawls 116 and 117 are opened or closed. The cylinder 111, the fixed and movable pawls 116 and 117 and the cylinder 118 form as a whole introducing means 121 for grasping the front end of the extruded material 3 from the extruder 1 and moving forward to introduce the extruded material 3 to the belt conveyor 105. A conveyor 120 is arranged in front of the belt conveyor 105.

Referring to FIG. 8, a cylinder 126 is secured to a rear end of the rockable frame 107 to extend in the second direction. A plurality of couplers 129 are connected through a support plate 128 to a distal end of a piston rod 127 of the cylinder 126. When the material 3 is being extruded from the extruder 1, these couplers 129 are pressed against the die assembly 2 to supply hot water to the assembly 2 so as to heat the die assembly 2.

Referring to FIGS. 1 and 2, in addition to the extruder 1 and the moving passage of the carriage 14 or the rails 12, there is provided a storing frame 131, on which are arranged a plurality of storing stands 132 equally spaced apart from each other in the first direction. Different kinds of die assemblies 2 are stored in the respective storing stands 132. Each storing stand 132 has a pair of rails 133 arranged on the storing frame 131 and extending in the second direction. Slide members 135 are slidably supported through slide blocks 134 on the each pair of rails 133. To the storing frame 131 are connected head ends of cylinders 136, each having a piston rod 137 whose end is connected to the slide members 135. As a result, when the cylinders 136 are actuated, the slide members 135 are moved in the second direction being guided by the rails 133. Onto each slide member 135 is mounted a heating block 138 similar in construction to the heating block 78. As a result, the die assemblies 2 stored in the respective storing stands 132 are always heated by supplying hot water.

Referring to FIGS. 1, 2, 3 and 9, a front positioning member 141 and a rear positioning member 142 are secured to the front and rear surfaces of the frame 15 correspondingly to each of the respective grasping units 28. Each of the positioning members 141 and 142 has a pair of positioning pieces 143 and 144 spaced from each other in the first direction. A bracket 146 is provided on an extension line of the extruder 1 on the floor 13 forwardly of the rails 12. Onto the bracket 146 is mounted a cylinder 147 extending in the second direction. Moreover, to the bracket 146 is secured a horizontal plate 148 which is formed with an elongated aperture 149 extending in the second direction.

Ends of a pair of first links 151 are pivotally connected to one end of a piston rod 150 of the cylinder 147 by a pin 152 inserted in the elongated aperture 149. One end of a second link 155 is pivotally connected to the other end of each first link 151 through a pin 154 having a roller 153. The other end of each second link 155 is pivotally connected through a pin 156 to the plate 148. When the piston rod 150 is retracted in the cylinder 147, the first and second links 15 and 155 are stationary at the positions shown in solid lines in FIG. 9. However, when the piston rod 150 is extended out of the cylinder 147, the links 151 and 155 are moved into the positions shown in phantom lines in FIG. 9.

If the first links 151 are positioned between the positioning pieces 143 and 144 of the front positioning member 141, the rollers 153 urge the positioning pieces 143 and 144 in an opposite direction, thereby positioning and fixing the carriage 14 in a predetermined position. The cylinder 147, the plate 48, the elongated aperture 149, the first links 151, the pin 152 and the second links 155 form as a whole a positioning and fixing mechanism 157. Moreover, the front positioning member 141 and the positioning and fixing mechanism 157 form as a whole first positioning and fixing means 158 for positioning and fixing the carriage 14 so as to cause the grasping units 28 to position immediately before the extruder 1.

Moreover, the storing frame 131 immediately below the respective storing stands 132 is also provided with positioning and fixing mechanisms 161 similar in construction to the positioning and fixing mechanism 157. As a result, when the carriage 14 has been moved to bring any one of the grasping units 28 into a position immediately before the desired storing stand 132, the positioning and fixing mechanism 161 immediately below the storing stand 132 is operated to position and fix the carriage 14. The rear positioning member 142 and the positioning and fixing mechanism 161 form as a whole second positioning and fixing means 162 for positioning and fixing the carriage 14 when any grasping member 28 arrives immediately before the desired storing stand 132.

The operation of the apparatus above described as one embodiment of the invention will be explained hereinafter.

It is assumed that the extruder 1 is being operated to continuously extrude the material 3 from the die assembly 2 and the belt conveyor 105 runs in the direction of the arrow to transfer forward the extruded material 3. At this time the die assembly 2 mounted on the extruder 1 is grasped on its both sides by one of the grasping units 28 nearer to the storing stands 132. On the other hand, the used die assembly 2 is arranged on the heating means 76 and grasped by the grasping unit 28 remote from the storing stands 132.

In order to distinguish the components on the elevator frames 26 nearer to the storing stands 132 or on the right side and remote from the storing stands 132 or on the left side viewed in FIG. 1, the former and latter components are referred with "on one side" and "on the other side", respectively.

The cylinders 46 on one side are then actuated to retract the piston rods 47 to remove the insert portions 49 of the grasping pins 48 from the rectangular apertures 50 of the die assembly 2 on the extruder 1. Grasping the die assembly 2 by one grasping unit 28 on one side is released in this manner. At this time, however, the die assembly 2 is clamped to the extruder 1 by a clamp mechanism (not shown) so that it does not fall or move.

Thereafter, the cylinders 36 on one side are actuated to retract the piston rods 37 so as to move forward the grasping unit 28 away from the extruder 1. Then, the cylinders 57 on one side are actuated to extend the piston rods 58 so as to rotate the grasping pins 48 through 90°. The cylinder 66 on one side is actuated to retract the piston rod 67, the elevator frame 26 and the grasping unit 28 are lowered in unison. At this time, the pinions 70 in mesh with the racks 68 are rotated in synchronism with each other by the chain 72 so that the elevator frame 26 is smoothly lowered. In this manner, the grasping unit 28 on one side is moved to a position where it does not interfere with the extruded material 3 and equipment about it. In this case, the grasping unit 28 having a pair of the arms 41 vertically extending is moved in vertical directions by the cylinder 66 so that the grasping unit 28 on one side performs the movement above described without interfering with the material 3 being extruded, for example, without cutting the material. The cylinder 147 of the positioning and fixing mechanism 157 is then actuated to retract its piston rod 150 so that the first and second links 151 and 155 are displaced from the position shown in phantom lines to the position shown in solid lines in FIG. 9 to release the positioning and fixing of the carriage 14.

Thereafter, the motor 19 is energized to rotate the wheels 17 to move the carriage 14 along the rails 12 toward the storing stands 132 or to the right viewed in FIG. 1. Such movement of the carriage 14 is stopped when the grasping unit 28 on the other side arrives at the position in opposition to the vacant or empty storing stand 132. Then, the positioning and fixing mechanism 161 arranged immediately below the storing stand 132 is operated to engage the other rear positioning member 142 so that the carriage 14 is positioned in that position and fixed thereat. The piston rod 67 of the cylinder 66 on the other side is then extended to raise the elevator frame 26 together with grasping unit 28 so that the used die assembly 2 grasped by the grasping unit 28 is raised away from the heating means 76. Thereafter, the piston rod 37 of the cylinder 36 on the other side is extended to move the grasping unit 28 and the die assembly 2 rearwardly toward the empty storing stand 132. At this time, the cylinder 136 of the empty storing stand 132 is actuated to extend its piston rod 137 to move forward the slide member 135 and heating block 138 to the position shown in phantom lines in FIG. 2. The piston rod 67 of the cylinder 66 on the other side is retracted to lower the elevator frame 26, the grasping unit 28 and the die assembly 2 in unison. In this manner, the used die assembly 2 is located on the heating block 138 of the empty storing stand 132. The piston rods 47 of the cylinders 46 of the grasping unit 28 on the other side are then retracted to remove the grasping pins 48 from the rectangular apertures 50 of the die assembly 2. The used die assembly 2 is thus released from the grasping of the grasping unit 28 on the other side so that the die assembly 2 is fed from the grasping unit 28 to the storing stand 132. Thereafter, the cylinders 66 and 36 on the other side are actuated to move the grasping unit 28 upward, forward and downward, sequentially so that the grasping unit 28 is returned to the original position, while the cylinder 136 is actuated to return the die assembly 2 and the slide member 135 into the positions shown in solid lines in FIGS. 1 and 2. The positioning and fixing mechanism 161 immediately below the empty storing stand 132 is actuated to release the positioning of the rear positioning member 142 on the other side.

The motor 19 is then actuated to move the carriage 14 to the left or right to move the grasping unit 28 on one side to the position in opposition to the die assembly 2 to be next used stored in any storing stand 132. The positioning and fixing mechanism 161 immediately below the relevant storing stand 132 is then actuated to engage the rear positioning member 142 on the other side to position and fix the carriage 14 at the position. Thereafter, the cylinders 66 and 36 on one side are actuated to move the grasping unit 28 upward and rearward sequentially. At this instant, the cylinder 136 is actuated to extend the piston rod 137 so that the die assembly 2 to be next used is advanced to the position shown in phantom lines in FIGS. 1 and 2. The cylinder 66 on one side is then actuated to lower the grasping unit 28. The lowering of the grasping unit 28 is stopped when the grasping pins 48 are aligned with the rectangular apertures 50 of the die assembly 2 to be next used.

Thereafter, the cylinders 46 on one side are actuated to extend the piston rods 47 so that the tapered insert portions 49 of the grasping pins 48 are inserted into the rectangular apertures 50 of the die assembly 2. The die assembly 2 to be next used is thus grasped on both sides by the grasping unit 28 on one side. The cylinders 66 and 36 on one side are then actuated so that the grasping unit 28 on one side grasping the die assembly 2 to be next used is moved upward, forward and downward sequentially, thereby arranging the die assembly 2 on the heating block 78 of the heating means 76 on one side. As a result, the die assembly 2 to be next used is always supplied with hot water from the heating block 78 so that the die assembly 2 can be heated immediately before it is mounted on the extruder 1. Then, the cylinder 136 of the storing stand 132 is actuated to move the slide member 135 forward into the initial position. The positioning and fixing mechanism 161 immediately below the storing stand 132 is then actuated to release the positioning and fixing of the rear positioning and fixing member 142 on one side.

Thereafter, the motor 19 is energized to move the carriage 14 to the right to the position where the grasping unit 28 on the other side is facing to the extruder 1. The positioning and fixing mechanism 157 is then actuated so as to engage the front positioning member 141 on the other side to position and fix the carriage 14 at that position. The piston rod 67 of the cylinder 66 on the other side is then extended to raise the grasping unit 28. Thereafter, the piston rods 58 of the cylinders 57 are extended to rotate the grasping pins 48 through 90°. The piston rods 37 of the cylinders 36 on the other side are then extruded to move the grasping unit 28 toward the extruder 1 until the grasping pins 48 are brought into alignment with the rectangular apertures 50 of the die assembly 2 on the extruder 1. The cylinders 46 on the other side are then actuated to insert the grasping pins 48 into the rectangular apertures 50 of the die assembly 2. In this manner, the die assembly 2 is grasped on both sides by the grasping unit 28 on the other side. In this case, the grasping unit 28 on the other side does not interfere with the extruded material 3 in the same manner as in the case above described.

The exchanging operation of the die assemblies 2 is effected during the extrusion of the material 3, while the carriage 14 and the grasping units 28 are remote from the extruder 1. Therefore, there can be provided many exchanging positions of the die assemblies 2. Moreover, such exchanging positions or the storing stands 132 are sufficient to be simple in construction because the storing stands 132 move to receive the die assemblies 2. As a result, the apparatus is simple in construction and inexpensive. Further, the extrusion of the material is continued, while the grasping unit 28 on the other side is grasping the die assembly 2 on the extruder 1.

On termination of the extruding operation, the cylinder 86 on the other side is actuated to extend the piston rod 87 so that the cutter 88 is moved slidably on the front surface of the die assembly 2 to cut the material 3 extruded therefrom along its width. At this moment, retaining rollers (not shown) lower from above to embrace cut end of the extruded material 3 between the belt conveyor 105 and the retaining rollers to prevent the cut end from deforming. The clamp mechanism of the extruder 1 is then actuated to release the die assembly 2. At the same time, the piston rod 127 of the cylinder 126 is retracted to move the coupler 129 away from the die assembly 2, thereby stopping the heating of the die assembly 2. Then, the piston rod 110 of the cylinder 109 is extended to rock the belt convey 105 and the introducing means 121 from the horizontal positions A shown in solid lines to the retracted positions B shown in phantom lines in FIG. 2 to provide a wide space for exchanging the die assemblies 2 immediately before the extruder 1.

The extruder 1 is then operated for a very short period of time to extrude the material 3. As a result, the die assembly 2 is moved away from the extruder by the extruding material 3. Thereafter, the piston rod 92 of the cylinder 91 is extended to cut the rubber flowing from the delivery opening of the extruder 1 by the cutter 93. In this manner, the die assembly is completely separated from the extruder 1. During the operation of the extruder 1, the piston rods 37 of the cylinders 36 are retracted to cause the grasping unit 28 to follow the movement of the die assembly 2.

Thereafter, the cylinders 36 on the other side are actuated to move forward the grasping unit 28 grasping the used die assembly 2. The cylinders 57 on the other side are then actuated to rotate the grasping pins 48 and the die assembly 2 through 90° so that the extruding passages in the die assembly 2 are made vertical, thereby facilitating the operation for removing the rubber remaining in the die assembly 2. The cylinder 66 on the other side is actuated to lower the grasping unit 28 to locate the die assembly 2 on the heating means 76. The positioning and fixing mechanism 157 is then actuated to release the positioning of the carriage 14.

The motor 19 is then energized to move the carriage 14 until the grasping unit 28 on one side arrives immediately before the extruder 1. The positioning and fixing mechanism 157 is then actuated to engage the front positioning member 141 to position and fix the carriage 14 thereat. The piston rod 67 of the cylinder 66 is then extended to raise the grasping unit 28 grasping the die assembly 2 to be next used. Thereafter, the piston rod 58 of the cylinder 57 is retracted to rotate the die assembly 2 through 90°. The cylinders 36 on one side are extruded to move the grasping unit 28 and the die assembly 2 toward the extruder 1 so that the die assembly 2 is mounted on the extruder 1. The clamp mechanism of the extruder 1 is then operated to clamp the die assembly 2 to the extruder 1. If the clamping makes difficult the removal of the grasping pins 48 from the die assembly 2, such a difficulty can be eliminated by temporarily removing the grasping pins 48 from the die assembly 2 immediately before the die assembly 2 is clamped. In this case, the delivery opening of the extruder 1 is preferably provided at its lower portion with a guide in order to prevent the die assembly from moving in the second direction.

The piston rod 110 of the cylinder 109 is then retracted to return the belt conveyor 105 and the introducing means 121 from the awaiting position B to the horizontal position A. The piston rod 127 of the cylinder 126 is then extended to press the coupler 129 to the die assembly 2 to heat it. The cylinder 111 is then actuated to move the slider 115, the fixed pawl 116 and the movable pawl 117 to a position immediately before the die assembly 2 of the extruder 1. Thereafter, the extruder 1 is operated to extrude the material 3 from the die assembly 2. A forward end of the extruded material 3 is detected by a detecting bar 171 and the cylinder 118 is actuated so that the forward end of the material 3 is grasped by the fixed and movable pawls 116 and 117. The cylinder 111 is then actuated to introduce forward the material 3 which is continuously extruded from the extruder 1 and grasped by the fixed and movable pawls 116 and 117. When the forward end of the extruded material 3 has arrived at a predetermined position, the cylinder 118 is actuated to open the fixed and movable pawls 116 and 117 so that the extruded material 3 falls by gravity onto the belt conveyor 105 and is loaded thereon. The material 3 continuously extruded from the extruder 1 is then transferred forward for a next step by the belt conveyor 105 and the conveyor 120. The above operation is of one cycle for exchanging the die assemblies 2 according to the invention. Thereafter, this cycle is repeated.

Although the carriage 14 has been explained moved in the first direction by the motor 19 in the above embodiment, it may be moved by a cylinder, a screw shaft or a rack-pinion mechanism in the scope of the invention. The grasping units 28 are moved in the second and third directions by the cylinders 36 and 66 in the above embodiment. However, the grasping units 28 may be moved by a screw shaft or a rack-pinion mechanism. Moreover, the grasping units 28 may be moved in the second and third directions by rocking movements instead of the linear movements.

As can be seen from the above explanation, according to the invention, during extruding the material the die assemblies can be exchanged by the carriage and grasping units which move away from the extruder so that there can be provided a number of exchanging positions or storing stands for the die assemblies. Moreover, the grasping units move to receive the die assemblies so that the storing stands can be simplified in construction, with the result that the apparatus can be simplified and inexpensive.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An apparatus for exchanging die assemblies for an extruder, comprising a carriage arranged on an extruding side of the extruder, first moving means for moving said carriage along a first axis perpendicular to an extruding direction of the extruder and in parallel with a horizontal, two grasping units supported by said carriage and spaced from each other along the first axis, second moving means for moving said grasping units along a second axis parallel with said extruding direction, respectively, third moving means for moving said grasping units along a third axis perpendicular to said first and second axes, respectively, and a plurality of storing stands arranged spaced apart each other along the first axis beside a moving passage of said carriage for storing various kinds of die assemblies, respectively, and each of said grasping units extending along said third axis and having a pair of arms provided with grasping means for grasping the die assembly.

2. An apparatus as set forth in claim 1, wherein said first moving means for moving the carriage comprises a motor arranged on the carriage, a first sprocket fixed to an output shaft of the motor, a second sprocket fixed to one of axles of said carriage, and a chain extending about said sprockets.

3. An apparatus as set forth in claim 1, wherein said grasping means comprises two cylinders, and two grasping pins connected to piston rods of said two cylinders, respectively, thereby grasping the die assembly on both sides thereof by inserting said grasping pins into apertures formed in said die assembly.

4. An apparatus as set forth in claim 1, wherein said pair of arms comprise movable members arranged on slide rails and extending along the second axis and arm members extending along the third axis and having upper ends fixed to said movable members.

5. An apparatus as set forth in claim 1, wherein said second moving means comprises at least one cylinder.

6. An apparatus as set forth in claim 1, wherein said storing stand comprises a pair of rails extending along said second axis a slide member slidable on said rails, a cylinder whose head is connected to a storing frame supporting the storing stands and whose piston rod is connected to the slide member, and heating means arranged on the slide member.

7. An apparatus as set forth in claim 6, wherein said heating means comprises a heating block formed therein with a plurality of passages for a heating medium.

8. An apparatus as set forth in claim 1, wherein said carriage comprises heating means comprising a heating block formed therein with a plurality of passages for a heating medium.

9. An apparatus as set forth in claim 1, wherein the apparatus comprises first cutting means for cutting a material in a width direction immediately after extrusion from the extruder and second cutting means for cutting said material flowing from a delivery opening of the extruder.

* * * * *